United States Patent [19]

Walliker et al.

[11] Patent Number: 4,809,329
[45] Date of Patent: Feb. 28, 1989

[54] APPARATUS FOR USE IN CONJUNCTION WITH LIPREADING BY THE PROFOUNDLY DEAF

[75] Inventors: John R. Walliker, Epsom; Stuart M. Rosen; Adrian J. Fourcin, both of London, all of England

[73] Assignee: National Research Development Corporation, London, England

[21] Appl. No.: 902,963

[22] Filed: Aug. 29, 1986

[51] Int. Cl.$^4$ .............................................. G10L 5/00
[52] U.S. Cl. ...................................... 381/36; 381/41; 381/51; 364/513.5; 434/112
[58] Field of Search .................. 128/12, 419 R, 420.5, 128/420.6; 381/68, 68.2, 41–50; 379/52; 434/112; 358/85

[56] References Cited

U.S. PATENT DOCUMENTS

| | | | |
|---|---|---|---|
| 4,187,413 | 2/1980 | Moser | 381/68 |
| 4,368,459 | 1/1983 | Sapora | 434/112 X |
| 4,510,936 | 4/1985 | Fourcin et al. | 128/419 R |
| 4,520,501 | 5/1985 | DuBrucq | 381/48 |
| 4,546,383 | 10/1985 | Abramatic et al. | 358/85 |
| 4,621,256 | 11/1986 | Rusk | 324/175 X |
| 4,654,636 | 3/1987 | Rusk | 324/175 X |

OTHER PUBLICATIONS

Rosen et al, "Voice Pitch as an Aid to Lipreading", Nature, vol. 291, May 14, 1981, pp. 150 to 152.
Walliker et al, "Signal Processing Hearing Aids for the Totally and Profoundly Deaf", Aug. 1985, Melbourne.
Fourcin et al, "A Speech Pattern Element Stimulation in Electrical Hearing", Aug. 29, 1983.

Primary Examiner—Peter S. Wong
Assistant Examiner—Emanuel Todd Voeltz
Attorney, Agent, or Firm—Cushman, Darby & Cushman

[57] ABSTRACT

The profoundly deaf benefit in lipreading if the larynx frequencies of speech are presented to them by means of acoustic sine waves. In the present invention the sine waves required are generated using a microcomputer and analogue output circuits, with the microcomputer providing digital level samples for the required sine waves from a stored look-up table. The wide frequency range of sine waves required is achieved by omitting some samples in each cycle at high frequencies, and the wide range of output levels required is provided by employing two digital to analogue converters, one acting as an attenuator.

10 Claims, 4 Drawing Sheets

"Begin Output" subroutine

"Select octave" routine

"Continue output" subroutine

APPARATUS FOR USE IN CONJUNCTION WITH LIPREADING BY THE PROFOUNDLY DEAF

BACKGROUND OF THE INVENTION

The present invention relates to apparatus which generates an audio signal from speech and which is of assistance to the profoundly deaf when lipreading.

As mentioned in "Speech Pattern Element Stimulation in Electrical Hearing" by Adrian Fourcin, Ellis Douek, Brian Moore, Evelyn Abberton, Stuart Rosen and John Walliker, Archives of Otolaryngology, Vol. 110, March 1984, the profoundly deaf may be assisted in lipreading if larynx frequency information is presented to them acoustically in pure sine wave form. The explanation for this finding is not certain, but may be that a sinusoid is the only waveform which can pass through a dispersive linear filter (transducer, ear canal, tympanic membrane, ossicular chain [if present], cochlea) and still retain its overall shape.

A major problem which is encountered in producing the required sine wave output is the generation of an accurate sine wave of varying amplitude over a frequency range from about 30 Hz to about 800 Hz.

SUMMARY OF THE INVENTION

According to the present invention there is provided apparatus for generating a sine wave audio signal from a sound having a complex waveform, comprising:
a sound to electrical signal transducer,
a pitch extractor for deriving a pitch signal representative of the fundamental frequency of the transducer output signal,
a processor for storing a table of sine wave samples and programmed to read through the table cyclically, reading in each cycle a number of table samples dependent on the pitch signal, and
a generator for generating an audio signal from the samples read.

By reading a stored table of sine wave samples in this way, the invention overcomes the problem of generating an accurate sine wave over a wide frequency range, but a further problem of due to the generation of spurious signals from steps in the resulting analogue waveform is likely to arise. For this reason it is preferable for the processor or the generator for generating the audio signal to low-pass filter the samples in order to generate the audio signal. Where the samples are digital the processor may be programmed according to a filtering algorithm, or the generator for generating an audio signal may include a digital to analogue converter and a low-pass filter.

Another problem encountered in generating a suitable sine wave is the wide range of output level required. For this reason the generator for generating an audio signal may include first and second multiplying digital to analogue converters (that is, converters in which a digital input code is multiplied by a reference signal in order to determine the magnitude of the analogue output). The second digital to analogue converter (D/A) is used as an attenuator and controls the amplitude of signals generated by the first D/A and for this purpose the output of the first D/A is connected as the reference signal for the second D/A.

Where the processor is a microcomputer or microprocessor its input signal from the pitch extractor and its output signal for the audio signal generator are in general at different frequencies - firstly because of the requirement to generate an accurate output side wave and secondly because it is often useful to reduce the frequency from the pitch extractor to a lower frequency which can be better received by a profoundly deaf person's ear (see UK Patent Application No. 2,133,697 and U.S. Pat. No. 4,510,936). For these reasons it is preferable for the processor to be "interrupt driven", and in order to obtain output samples accurately spaced in time for the sine wave the processor may be programmed to employ a timer to signal when samples are to be sent to the second D/A, each sample being read from the table of sine wave samples at a time, following the writing of the previous sample to the second D/A, when the processor has no higher priority operation to perform.

The present invention also encompasses methods corresponding to the invention and modifications thereof as described above.

BRIEF DESCRIPTION OF THE DRAWINGS

Certain embodiments of the invention will now be described by way of example with reference to the accompanying drawings, in which.

DETAILED DESCRIPTION OF THE PREFERRED EMBODIMENTS

Figure 1:
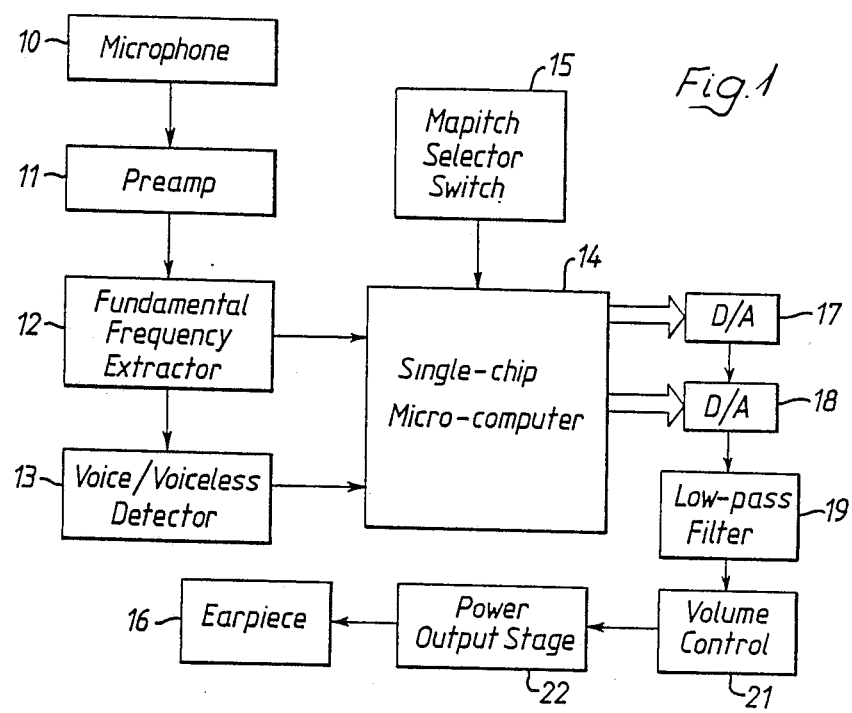
FIG. 1 is a block diagram of apparatus according to the invention.

In FIG. 1 a microphone 10, preferably an electret capacitor microphone, provides a high quality input signal which is passed to a preamplifier 11 and then to a pitch extractor circuit 12 which has two outputs, one to a voice/voiceless detector 13 and one to a single chip microcomputer 14. The microcomputer 14 may for example be type HD63P01, HD63701 or MC68HC11. Suitable circuits for the pitch extractor and voice/voiceless detector are described in U.K. Patent Application Nos. 8605973 and 8605974, respectively, and in U.S. Pat. No. 4,510,936. The pitch extractor provides pulses from which the microcomputer 14 determines the fundamental frequency of incoming speech. The voice/voiceless detector determines whether the incoming speech is voiced or not.

The microcomptuer 14 has an external control 15 which controls translation in frequency from that of the output of the pitch extractor 12 to a lower frequency. The amount of this translation is also controlled by the switch 15. Translation of this type is known as "mapitch" and is also described in the-above-mentioned applications and patent.

Having determined a fundamental frequency at which to excite an earpiece 16 from the output of the pitch extractor 12 and the mapitch control 15, the problem arises of generating an accurate sine wave of varying amplitude over a frequency range from about 30 Hz to about 800 Hz. A straightforward technique would be to store a data table containing side wave samples and to clock it out at regular intervals at a repetition frequency proportional to the frequency of the required sine wave.

Such an approach requires that the range of the output sampling frequency be very wide. If the number of samples per cycle is, say, 128 then a sampling frequency of up to 100 kHz would be needed, but this is clearly impractical unless a very high speed microcomputer or digital signal processing chip were used, which would have unacceptably high power consumption in this application.

In accordance with the present invention a table with typically 128 sine wave samples is stored, but the table is progressively under-sampled (that is samples are omitted) as the required output frequency increases. The sampling frequency always remains in the range about 2 to 4 kHz and at the highest frequencies only 4 samples per cycle are used. Steps in the waveform generated in this way are preferably removed so as to avoid high levels of harmonic distortion possibly interfering with transduction mechanisms in a damaged cochlea. This object is achieved by low pass filtering using, for example, a third order Bessel or Butterworth filter with a cut-off at about 600 Hz. With such a filter the output remains nearly sinusoidal even where only 4 samples per cycle are used at the highest output frequencies.

The required table is stored in the microcomputer 14, and the number of samples read from the table in each traversal of the table is controlled by the fundamental frequency determined as mentioned above. Where an unvoiced output is required this fundamental frequency may be changed on a random basis at the beginning of each traversal of the table. Alternatively, a more appropriate stimulus can be generated by the cyclic traversal of a table of suitably chosen "random" numbers. These can be chosen for minimum periodicity and maximum tolerable irregularity of amplitude within the range of frequencies audible to the listener. In a further important extension of this approach, subgroups of the components of the "random" stimulation can be selected so as to signal important fricative and voiced fricative contrasts.

As is described in more detail later, the microcomputer 14 outputs 8 bit digital signals to control D/As 17 and 18, the latter acting as an attenuator and the former to provide a signal proportional to sine wave sample magnitude. The analogue signal from the converter 18 passes to a low pass filter 19 whose characteristics have been mentioned above and then by way of a volume control 21 and a power output stage 22 to the earpiece 16.

Another problem encountered in providing a suitable signal for the earpiece is that of generating an accurate sine wave with its output varying over an output range of 40 dB. A resolution of at least 14 bits, preferably 16, is needed if the output is to be reasonably undistorted at low frequencies where high attenuations are likely to be needed.

High resolution linear D/As are costly and relatively large, and would cause problems with noise immunity and the need to carry out real-time multiplications in software to generate the correct output codes. Thus the straightforward output solution has many disadvantages. It is also necessary to exclude as an alternative logarithmic D/A because those currently available have poor monotonicity at high attenuations. Such D/As would therefore give rise to high distortion in the low frequency region where deaf users, because of their generally greater hearing sensitivity at lower frequencies, would probably be most likely to be affected.

Figure 2:
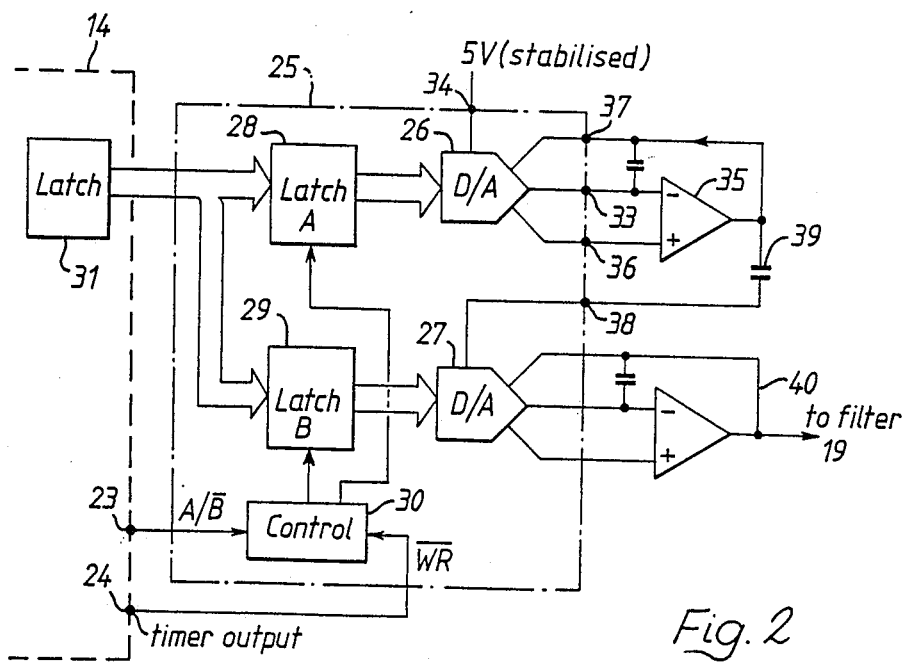
FIG. 2 is a more detailed block diagram of the digital to analogue converters and low pass filter of FIG. 1.

A solution to this problem was found by using dual CMOS multiplying D/As, in this example analogue devices type AD 7528. A device of this type is shown at 25 in FIG. 2 and comprises two D/As 26 and 27 with respective latches 28 and 29 and associated control logic 30. As soon as the latches 28 and 29 receive codes, the outputs of the D/As 26 and 27, respectively, take up a value equal to the product of the code and reference voltages applied to the respective D/As. The D/As 26 and 27 are equivalent to the D/As 17 and 18, respectively.

It is very important to avoid jitter in the timing of the D/A output since otherwise spurious output frequencies would be generated. In conventional use the D/A integrated circuit mentioned above would be connected to a microprocessor bus by way of address decoding logic and data would be sent to it by software write statements. The system is at present interrupt driven since changes in the pitch of incoming voice must be taken into account as soon as they occur and, additionally, it would be very inefficient to force interrupts to be serviced exactly when output samples are required. In other words, difficulties arise because the input frequency from the pitch extractor is not usually synchronised with the output frequency at the output of the D/A 18.

This problem has been overcome in the way which is now described. Just after each output sample of a sine wave is produced at the output of the D/A 26, the time and value of the following sample is determined from the look-up table and the value is written into a latched 8 bit port 31 of the microcomputer 14 where the data appears immediately and is retained until new data is written to the latch. The data in the latched port 31 is ignored for the time being by the integrated circuit 25, but the time at which this data is to be transferred to the circuit 25 is calculated and written to a timer output compare register (not shown) of the microcomputer 14. The processor is now free for other activities. When the internal timer of the microcomputer 14 matches the number stored in the output compare register, a timer output pin 24 changes state and in so doing applies a write signal to the control logic 30. As a result, the output of the latch 31 is transferred to the latch 28 selected by means of a signal applied to a terminal 23 of the microcomputer 14. This causes data from the latched port 31 to appear as an analogue output of the D/A 26 at exactly the right moment, even though the processor may be involved with some different task at the time. The signal from the output compare register generates an interrupt request which is serviced by the microcomputer 14 at a convenient time within about the next 150 microseconds, and the consequent interrupt subroutine then prepares the following sample in the way just described.

The sine wave samples generated at the output of the D/A 26 are in the form of currents at a terminal 33 which are proportional to the code applied by the latch 28 multiplied by a stabilised reference voltage of approximately 5 volts applied at a terminal 34. For correct operation the terminal 33 must be a virtual earth and for this reason it is connected to the inverting input of an operational amplifier 35 whose non-inverting input is connected to ground at a terminal 36. In order to produce a voltage output signal, a feedback connection for the output of the amplifier 35 is provided to a terminal 37 of the D/A 26. The analogue output of the amplifier 35 is therefore a stepped approximation to the required sine wave and this waveform is used as the reference voltage (in this case varying) for the D/A 27. Coupling from the output of the amplifier 35 to a reference voltage terminal 38 is by way of a capacitor 39 which removes the d.c. component.

The D/A 27 controls the attenuation of the sine wave produced, and the required attenuation is passed by the microcomputer 14 to the latch 29 only at the start of a sine wave cycle and is maintained at that value throughout the cycle. This distortion in the sinewave is avoided. The microcomputer 14 is progammed so that at a convenient time after the last amplitude value of a sinewave cycle has been passed to the latch 28, the next attenuation value is generated together with the time of the beginning of the next sine wave cycle. Before the timer reaches this time the output compare register causes the terminal 23 to apply a signal to the control logic 30 to select the latch 29 and an attenuation value is passed from the latched port 31 and stored in latch 29 by lowering and then raising the voltage on connection 24.

The D/A 27 has its output connected to an operational amplifier in the same way as the D/A 26, and the final output for application to the filter 19 appears at a connection 40.

Amplitude values are derived from a frequency versus amplitude table stored by the microcomputer 14 and this table is usually individual to the user. The signal from the pitch extractor enables amplitude to be selected by the microcomputer from the table and applied to the latch 29. In addition, or as an alternative, an envelope detector (either hardware or software) may be used to determine the amplitude of the output of the microphone 10, and this signal (when hardware) can be applied by way of an A/D (not shown) to the microcomputer 14 to determine, wholly or partially, the codes sent to the latch 29.

Information relating to the amplitude required for each patient at various frequencies and the reduction in frequency between the fundamental and the sine wave produced at each frequency for a person may be stored in a piggyback or on-chip EPROM or an electrically erasable EPROM connected to, or forming part of, the microcomputer 14.

A flow diagram and description of how the periods T' and the amplitudes i of the sine wave to be generated are found by the computer 14 is given in the above-mentioned UK Patent Application and U.S. Pat. Nos. (see FIG. 9 and accompanying description). The operations of this flow diagram are carried out each time a pulse is received from the fundamental frequency extractor 12. One of the operations carried out is to set a flag F1 to indicate that T' is available, and a test is carried out on another flag F2 to determine whether an output is in progress. That is, it is determined whether a sine wave output is in the process of being generated by the D/A 17 and 18. If F2 is false, a "Begin Output" routine shown in FIG. 3 of this specification is called.

Figure 3:
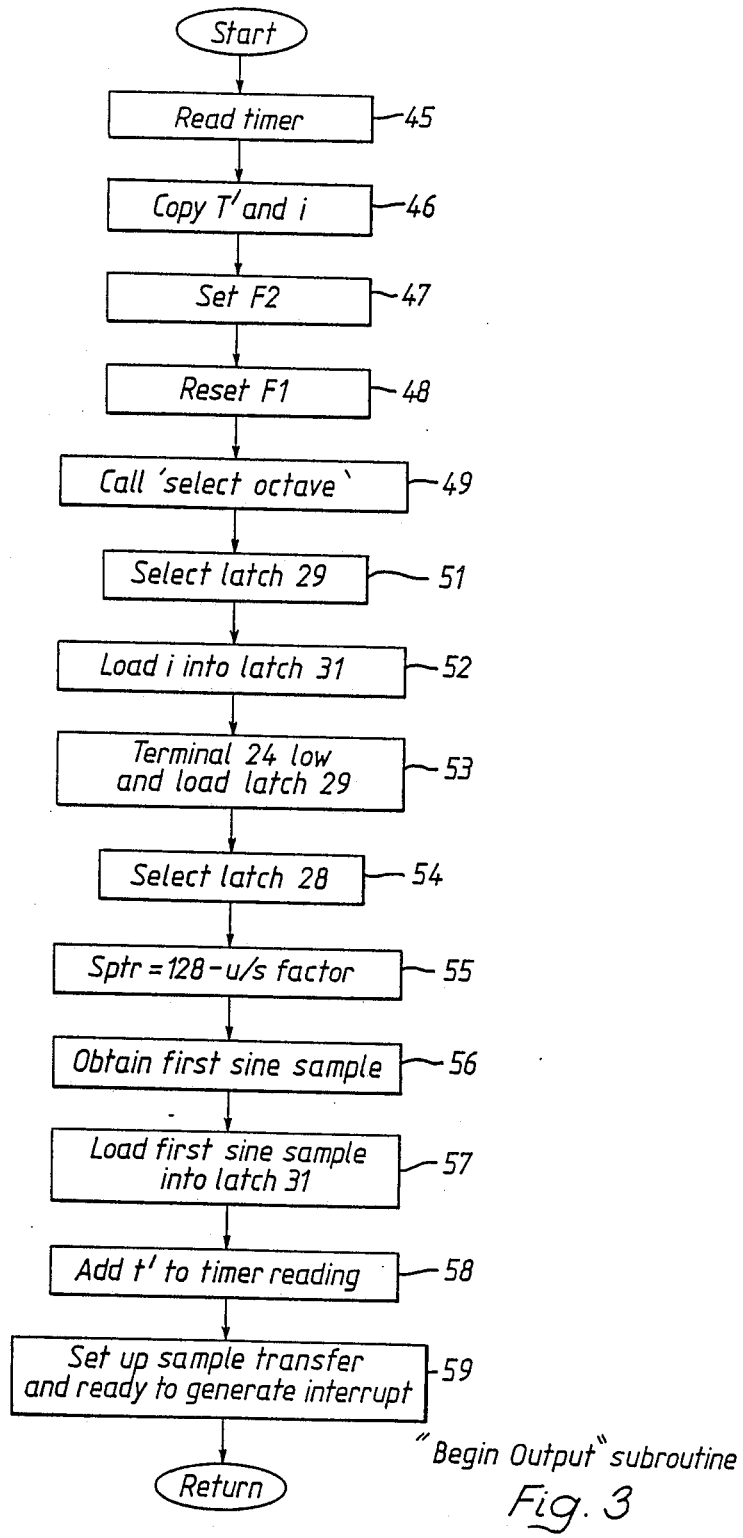
FIG. 3 is a flow diagram of a "Begin Output" subroutine for the microcomputer of FIG. 1.

The first operation 45 of FIG. 3 is to read the internal timer of the microcomputer 14 and save the result. Next the values T' and i found as described above are copied (operation 46) for further use. Since an output is now being generated the flag F2 is set, but because T' and i have now been copied the flag F1 is reset (operations 47 and 48). A subroutine "select octave" is called in and as a result three values dependent on the period T' of the sinewave to be generated are found: an under-sampling (u/s) factor, the number of samples/cycle (operation 49) and the time between output samples t' (operation 68). Having obtained this information the latch 29 is selected in an operation 51 by applying a control signal to the terminal 23, and then an operation 52 is carried out to read the amplitude value i into the latch 31. Having selected the latch 29 it is now only necessary to force the terminal 24 low (operation 53) to enter i into the latch 29.

Having set the required amplitude a first sine wave sample value is required for the latch 28, and this latch is selected by way of a terminal 23 in the operation 54. Next an index "sptr" for selecting the correct sample value from the sine wave sample table is set according to an equation $$sptr = 128 - \mu/s \text{ factor}$$

in an operation 55. The index found is used to obtain the required sample value and loaded into the latch 31 (operations 56 and 57).

Figure 5:
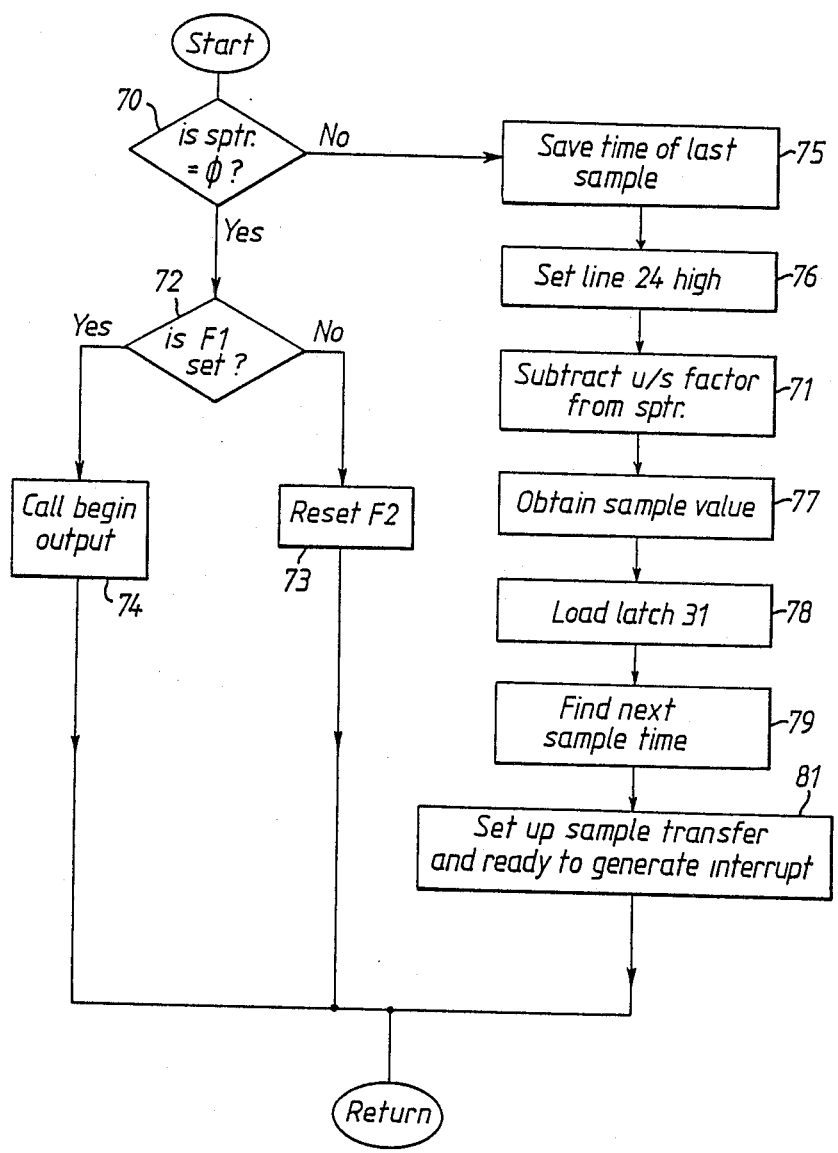
FIG. 5 is a flow diagram of a "Continue Output" subroutine.

A value t' is now added to the saved timer reading (operation 58) to give the time the next sample is to occur for use in a "continue output" subroutine (see FIG. 5). Then, in an operation 59, the output compare register is set up to force the terminal 24 low and generate an interrupt when the first sine wave sample is required as indicated by the timer reaching the value held by the output compare register. At the time the interrupt occurs the sample value in the latch 31 is transferred to the latch 28, and at that time, or sometime later if the interrupt is masked (but in any case well before the next sample is required), a "continue output" subroutine (FIG. 5) is called.

Figure 4:
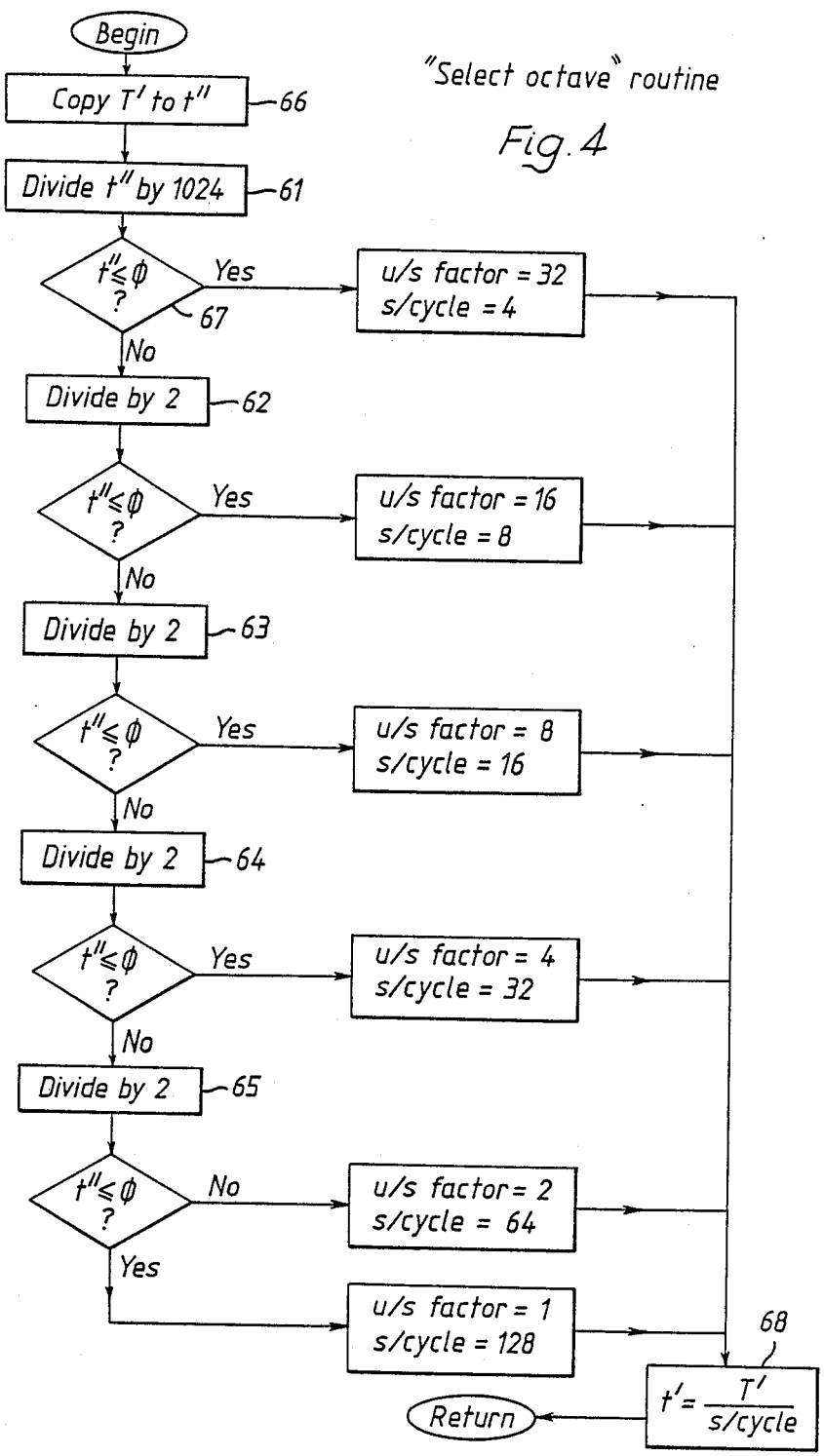
FIG. 4 is a flow diagram of a "Select Octave" subroutine.

The "select octave" routine carried out in operation 49 is shown in FIG. 4 and comprises five possible divide by two operations 61 to 65 following an operation 66 in which the value of T' is copied at t''. In operation 61 t'' is divided by 1024, for example, by shifting t'' to the right by 10 bits. A test 67 follows to determine whether t'' is now equal to or less than zero, which indicates that the frequency of the sine wave sample required is between 488 and 976 Hz. If test 67 is satisfied the $\mu/s$ factor is set to 32 and the number of samples required per cycle is set at 4. Tests 62 to 65 are similar to the test 61 except that division is by 2—that is, the shift of t'' to the right by 1 bit and the various $\mu/s$ factors and samples per cycle are as shown in FIG. 4. Each time a test following one of the division operations 62 to 65 is satisfied, and if the last of these operations is not satisfied the $\mu/s$ factor and samples per cycle are determined and then an operation 68 is carried out to set t' to a value obtained by dividing T' by the number of samples per cycle. t' is given in microseconds and divisions 62 to 65 provide the following frequency ranges respectively: 244 to 488 Hz, 122 to 244 Hz, 61 to 122 Hz, 30.5 to 61 Hz and 15.25 to 30.5 Hz.

As mentioned above, when the timer reaches the value held by the output compare register an interrupt occurs which calls the "continue output" subroutine of FIG. 5. First a test 70 is carried out to determine whether the last sample in a sine wave cycle has been sent to the latch 28 as indicated by the value sptr having reached zero following a number of operations 71. Then a test 72 is carried out to discover whether the flag F1 indicates that new values of T' and i are available. If not the flag F2 is reset to indicate that no output is in progress (operation 73), or if F1 is set, then the begin output subroutine is called in an operation 74.

If it is determined from the test 70 that the last sample has not been sent, then the time at which the previous sample was generated is saved from the output compare register in an operation 75. Next the terminal 24 is set high (operation 76) using the output compare register so that transfers to the latches 28 and 29 cannot be carried out until it is cleared.

The new value for the index of the sine wave sample table is obtained in the operation 71 by subtracting the μ/s factor from the previous sptr value, and the new index is used to obtain a sample value and load it into the latch 31 (operations 77 and 78). By adding t' to the value saved in the operation 75 (operation 79) the time at which the next sample is to be generated is determined, and in an operation 81 the output compare register is set to force the terminal 24 low and thus generate an interrupt at the time found in operation 79.

It will be apparent that the invention can be put into practice in many other ways from the specifically described. For example, the invention may be modified by using a microprocessor and ancillary chips rather than a single chip microcomputer, by using different forms of filter for the low pass filter 19, by using different integrated circuits and different schemes of digital to analogue conversion. It may be possible to omit the filter 19 if the response of the stage 22 and/or the earpiece 16 is such that in effect low-pass filtering occurs.

We claim:

1. Apparatus for generating a sine wave audio signal from a sound having a complex waveform, comprising:
   a sound to electrical signal transducer for deriving an output signal from incident sound,
   pitch extractor means for deriving a pitch signal representative of the fundamental frequency of the transducer output signal,
   processor means for storing a table of sine wave samples and programmed to derive an output signal by reading through the table cyclically, the number of table samples read in each cycle being dependent on the pitch signal, and
   means for generating an audio signal from the samples read.

2. Apparatus according to claim 1 wherein the output signal from the processor means is a digital signal and the means for generating an audio signal includes:
   digital to analogue converter means coupled to the processor means so as to receive the digital signal, and
   a low-pass filter coupled to the digital to analogue converter means and having a cut-off belot 650 Hz.

3. Apparatus according to claim 1 wherein the processor means is programmed according to a low-pass filtering algorithm with a cut-off below 650 Hz so as to filter the samples read from the table.

4. Apparatus according to claim 2 wherein the digital to analogue converter means comprises:
   first and second multiplying digital to analogue converters, each converter having a reference input, a code input and an analogue output where analogue signals appear of a magnitude proportional to the product of a reference signal applied at the reference input and a digital code applied at the code input,
   the first converter being coupled to receive said samples read from the table at its code input,
   the second converter being coupled to receive at its code input signals representative of a required amplitude of a sine wave from which the audio signals are generated,
   the analogue output of one of said converters being coupled to the reference input of the other said converter, and
   the analogue output of said other converter delivering, in operation, analogue samples of a sine wave of the required amplitude.

5. Apparatus according to claim 4 wherein
   the first digital to analogue converter provides an analogue output as soon as a digital code and a reference signal are applied, and
   the processor means includes a timer and a time comparator, the processor means being programmed to generate a sample value read from the table and an output time at which that sample is to be passed to the first analogue to digital converter at a time after the last sample was passed to said first converter when the processor means has no higher priority operations to carry out, and the time comparator causes the sample value to be passed to said first converter when the output time equals the content of said timer.

6. Apparatus according to claim 5 wherein
   the second digital to analogue converter provides an analogue output as soon as a digital code and a reference signal are applied, and
   the processor means is programmed to generate an amplitude value and a change-amplitude time at which the sine wave samples represent a zero crossing, the processor means generating the amplitude value and the change-amplitude time at a time after the last amplitude value was passed to said second converter when the processor means has no higher priority operations to carry out, and the comparator causes the amplitude to be passed to said second converter when the change-amplitude time equals the content of said timer.

7. Apparatus according to claim 1 wherein
   the processor means stores a further table giving amplitude values for different fundamental frequencies of said complex waveform, and is programmed to read amplitude values from the further table in accordance with the pitch signal, and the means for generating the audio signal is arranged to generate sine waves having amplitudes in accordance with the said amplitude values.

8. Apparatus according to claim 7 wherein the further table is based on the requirements of an individual user of the apparatus.

9. Apparatus according to claim 7 including amplitude-control means for determining the amplitude of the envelope of the output signal of said transducer, and wherein said amplitude values are also dependent on the output of the amplitude-control means.

10. Apparatus according to claim 1 wherein the processor means translates said fundamental frequency to a lower frequency and the processor means is programmed to read, in each said cycle, a number of table samples approximately inversely proportional to said lower frequency.

* * * * *